United States Patent [19]
Nakai

[11] Patent Number: 5,373,379
[45] Date of Patent: Dec. 13, 1994

[54] REPAIRABLE LIQUID CRYSTAL DISPLAY PANEL WITH LASER FUSIBLE LINKS

[75] Inventor: Yutaka Nakai, Yokohama, Japan

[73] Assignee: Kabushiki Kaisha Toshiba, Kawasaki, Japan

[21] Appl. No.: 60,542

[22] Filed: May 13, 1993

[30] Foreign Application Priority Data

May 13, 1992 [JP] Japan ................. 4-119430

[51] Int. Cl.$^5$ ................ G02F 1/1343; H01L 29/06; H01L 27/02
[52] U.S. Cl. ................... 359/59; 257/209; 257/530; 359/87
[58] Field of Search .......... 359/59, 87; 345/93; 257/209, 529, 530; 365/96

[56] References Cited

U.S. PATENT DOCUMENTS

| | | | |
|---|---|---|---|
| 4,829,481 | 5/1989 | Johnson et al. | 365/200 |
| 4,893,167 | 1/1990 | Boudou et al. | 357/51 |
| 5,025,300 | 6/1991 | Billig et al. | 357/51 |
| 5,062,690 | 11/1991 | Whetten | 359/59 |
| 5,121,236 | 6/1992 | Ukai et al. | |
| 5,260,818 | 11/1993 | Wu | 359/59 |
| 5,267,066 | 11/1993 | Nakai et al. | 359/67 |
| 5,303,074 | 4/1994 | Salisbury | 359/59 |

FOREIGN PATENT DOCUMENTS

| | | |
|---|---|---|
| 0461417 | 12/1991 | European Pat. Off. |
| 6462617 | 3/1989 | Japan |
| 4331923 | 11/1992 | Japan |
| 5-66415 | 3/1993 | Japan |

*Primary Examiner*—Anita Pellman Gross
*Assistant Examiner*—Charles Miller
*Attorney, Agent, or Firm*—Oblon, Spivak, McClelland, Maier, & Neustadt

[57] ABSTRACT

Disclosed is a wiring for an electronic circuit, comprising a substrate, a first conductor layer formed on said substrate, an insulating layer formed on said insulating layer, and a second conductor layer formed on said insulating layer such that said second conductor layer overlaps with at least a part of said first conductor layer, wherein an inner portion of at least one of the overlapping portions of said first conductor layer and said second conductor layer is removed at least partially to cause the peripheral portion to remain unremoved at least partially, thereby decreasing the area of the overlapping portion.

24 Claims, 6 Drawing Sheets

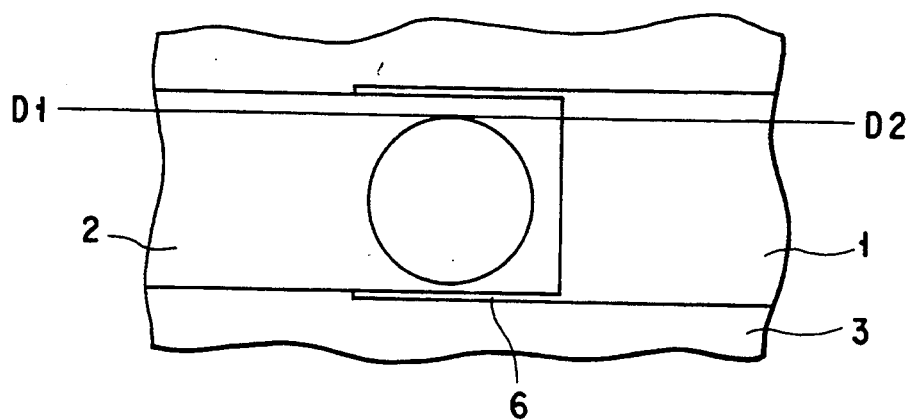
F I G. 1A
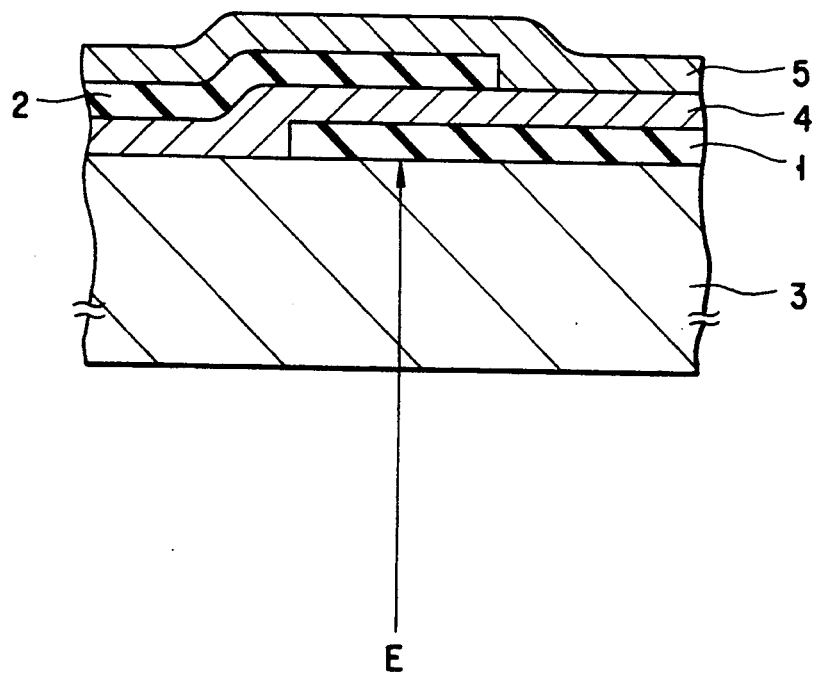
F I G. 1B

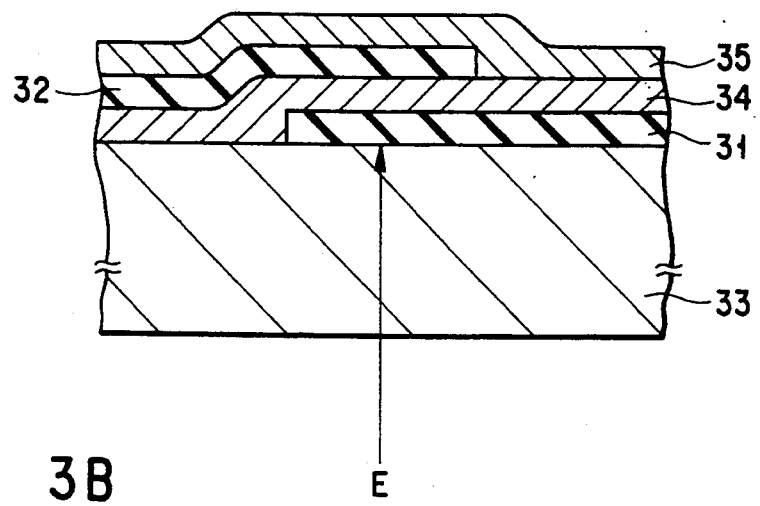
F I G. 3B
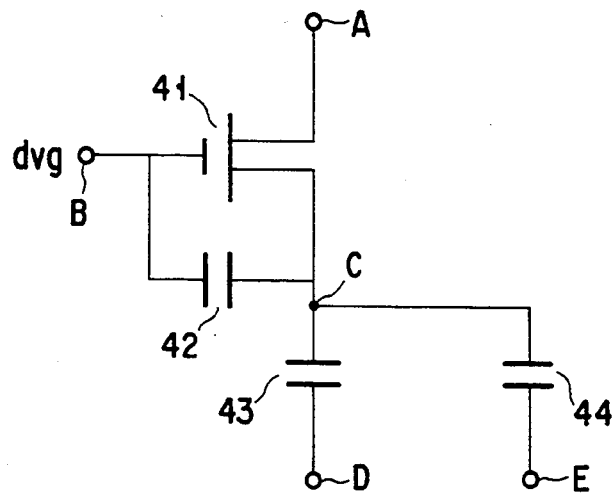
F I G. 4
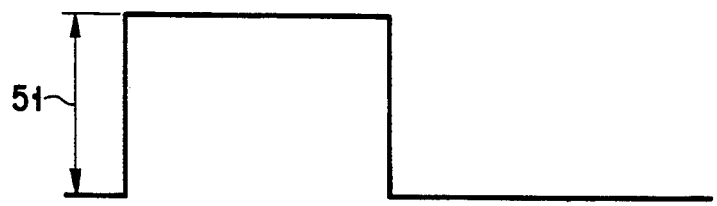
F I G. 5A
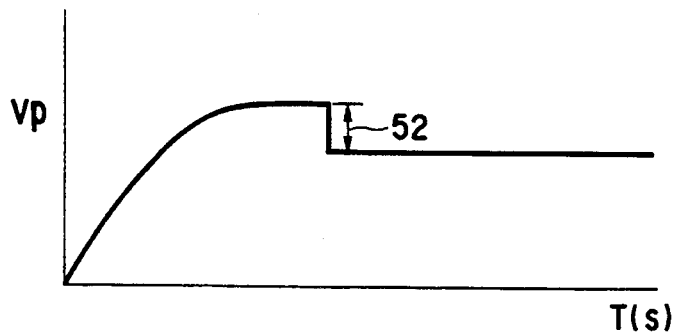
F I G. 5B

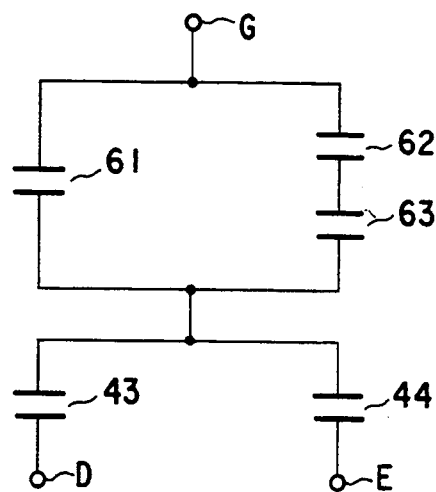
F I G. 6A
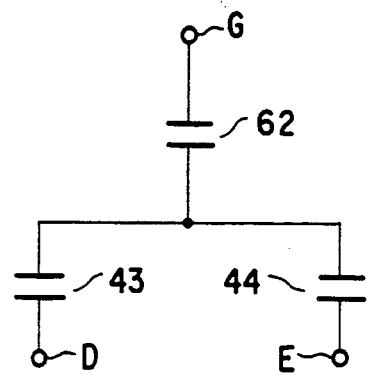
F I G. 6B
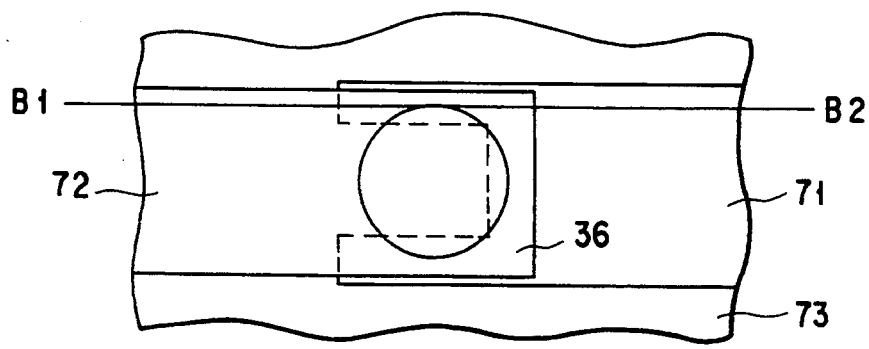
F I G. 7A
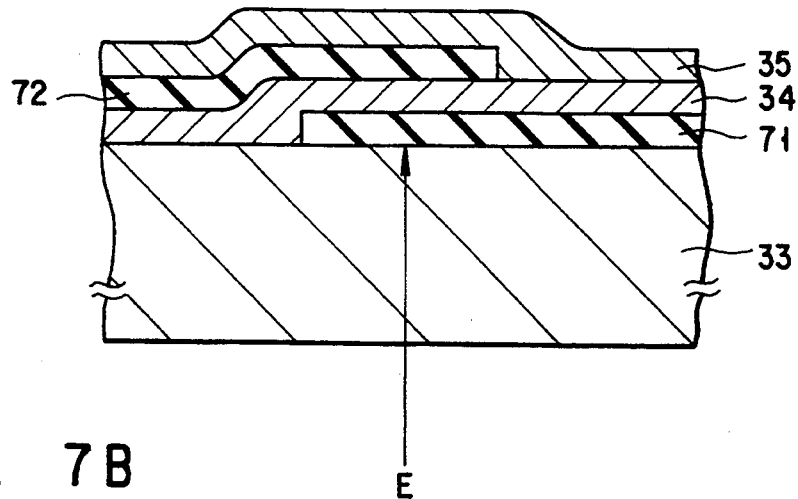
F I G. 7B

REPAIRABLE LIQUID CRYSTAL DISPLAY PANEL WITH LASER FUSIBLE LINKS

BACKGROUND OF THE INVENTION

1. Field of the Invention

The present invention relates to a wiring for an electronic circuit comprising a laser contact portion which permits electrically connecting a plurality of conductor layers by utilizing a laser beam irradiation.

2. Description of the Related Art

In recent years, vigorous researches are being made in an attempt to develop new types of display devices replacing a cathode ray tube (CRT). Among the various new types of display devices, a liquid crystal display device, which is thin and can be operated with a small power consumption, is expected to find wide applications in the household electric appliances and OA equipments. Particularly hopeful is a liquid crystal display device utilizing an active matrix system exhibiting excellent display characteristics, in which a thin film transistor (TFT) is used as a switching element. As a matter of fact, attractive articles of the particular liquid crystal display device are being developed nowadays.

What should be noted, however, is that the liquid crystal display device utilizing the active matrix system tends to become larger in size and finer in mechanism, leading to an increase in the number of picture elements used and to an increase in the density of the picture elements. As a result, the pixel defect is likely to take place with an increased rate, leading to a marked reduction in the yield.

To overcome the difficulty described above, it is proposed to arrange an auxiliary TFT, which is not electrically connected to a pixel electrode of a pixel, in addition to a TFT connected to the pixel electrode. Where the TFT connected to the pixel electrode fails perform a normal operation, the auxiliary TFT is connected to the pixel electrode by utilizing a high energy beam such as a laser beam.

FIGS. 1A and 1B collectively show a laser contact portion in which a plurality of conductor layers superposed one upon the other with an insulating layer interposed therebetween are connected to each other by means of laser beam irradiation. Specifically, FIG. 1A is a plan view showing a plurality of conductor layers superposed one upon the other. In FIG. 1A, a reference numeral 1 denotes a first conductor layer, and 2, a second and conductor layer. A laser beam irradiation is applied to a region denoted by a reference numeral 6. Since a laser beam is applied from a region on the side of a substrate, the first conductor layer 1 is irradiated first with the laser beam in the practical operation. Incidentally, an insulating film is omitted from the drawing of FIG. 1A.

FIG. 1B is a cross sectional view along the line $D_1$–$D_2$ shown in FIG. 1A. It is clearly seen that the first conductor layer 1, an insulating film 4, the second conductor layer 2 and a passivation film 5 are formed in this order on the surface of a substrate 3. In practice, a liquid crystal (not shown) is sealed in a region defined on the passivation film 5.

If a laser beam is applied in a direction E shown in FIG. 1B, the energy of the laser beam is absorbed first by the first conductor layer 1, with the result that the first conductor layer 1 is liquefied or gasified, leading to a volume expansion. It follows that the insulating film 4, the second conductor layer 2 and the passivation film 5 are broken to form a hole. What should be noted is that the liquid phase of the first conductor layer 1 is attached to wall of the hole formed as a result of the laser beam irradiation so as to permit the first conductor layer 1 to be fused to the second conductor layer 2. In this fashion, the first conductor layer 1 and the second conductor layer 2 are electrically connected to each other.

Where a laser beam is not applied, however, the laser contact portion naturally has a parasitic capacitance because the first and second conductor layers are superposed one upon the other with the insulating film interposed therebetween. The parasitic capacitance of the laser contact portion is so large as not to be negligible. On the other hand, the parasitic capacitance is eliminated in the case where the first and second conductor layers are connected to each other by the laser beam application. Naturally, the pixel in which the first and second conductor layers are connected to each other by the laser beam irradiation widely differs in the display characteristics from the pixel in which the first and second conductor layers are not connected to each other. This brings about nonuniform display characteristics so as to greatly impair the quality of the display device.

As described above, the conventional liquid crystal display device comprising a laser contact portion is defective in that the parasitic capacitance of the laser contact portion is so large as not to be negligible. As a result, the display characteristics of the liquid crystal display device are adversely affected seriously. What should also be noted is that the pixel in which an electrical connection is achieved in the laser contact portion by laser beam irradiation widely differs in the parasitic capacitance of the laser contact portion from the pixel in which the electrical connection is not achieved in the laser contact portion. As a result, the display characteristics of the pixels are rendered nonuniform, leading to a marked deterioration in the quality of the liquid crystal display device.

SUMMARY OF THE INVENTION

An object of the present invention is to provide a wiring for an electronic circuit comprising a laser contact portion in which the parasitic capacitance is small before the laser beam irradiation and electric contact can be ensured without fail after the laser beam irradiation.

Another object of the present invention is to provide liquid crystal display device including a wiring for an electronic circuit comprising a laser contact portion in which the parasitic capacitance is small before the laser beam irradiation and electric contact can be ensured without fail after the laser beam irradiation.

According to an aspect of the present invention, there is provided a wiring for an electronic circuit, comprising a substrate; a first conductor layer formed on said substrate; an insulating layer formed on said first conductor layer; and a second conductor layer formed on said insulating layer such that said second conductor layer overlaps with at least a part of said first conductor layer; wherein an inner portion of at least one of that portions of said first conductor layer and said second conductor layer which overlaps with each other is removed at least partially to cause the peripheral portion to remain unremoved at least partially, thereby decreasing the area of the overlapping portion.

According to another aspect of the present invention, there is provided a wiring for an electronic circuit, comprising a substrate; a first conductor layer formed on said substrate; an insulating layer formed on said first conductor layer; and a second conductor layer formed on said insulating layer such that said second conductor layer overlaps with at least a part of said first conductor layer, said second conductor layer being electrically connected to said first conductor layer upon irradiation of said overlapping portion of the first or second conductor with a laser beam; wherein an inner portion of at least one of the overlapping portions of said first conductor layer and said second conductor layer is removed at least partially to cause the peripheral portion to remain unremoved at least partially, thereby decreasing the area of the overflapping portion.

According to another aspect of the present invention, there is provided a liquid crystal display device, comprising a liquid crystal display substrate; a plurality of pixel electrodes formed on said substrate; a first thin film transistor and a second thin film transistor formed on said liquid crystal display substrate; a first wiring for achieving an electrical connection between said first thin film transistor and said pixel electrode; and a second wiring including laser contact portion, said second wiring being provided between said second thin film transistor and said pixel electrode; wherein the laser contact portion of said second wiring comprises a first conductor layer connected to said second thin film transistor; an insulating layer formed on said first conductor layer; and a second conductor layer formed on said insulating layer and electrically connected or to be connected to said pixel electrode such that said second conductor layer overlaps with at least a part of said first conductor layer, said second conductor layer being electrically connected to said first conductor layer upon irradiation of said overlapping portion of the first or second conductor with a laser beam; wherein an inner portion of at least one of the overlapping portions of said first conductor layer and said second conductor layer is removed at least partially to cause the peripheral portion to remain unremoved at least partially, thereby decreasing the area of the overlapping portion of the first conductor layer and the second conductor layer.

According to still another aspect of the present invention, there is provided a liquid crystal display device, comprising a liquid crystal display section; a driving circuit for driving said liquid crystal display section; a first wiring layer for achieving an electrical connection between said liquid crystal display section and said driving circuit; and a second wiring layer formed in the vicinity of the liquid crystal display section in a manner to cross said first wiring layer; wherein a cross point between said first wiring layer and said second wiring layer comprises a first wiring layer, an insulating layer formed on said first wiring layer, and a second wiring layer formed on said insulating layer to cross said first insulating layer, said second wiring layer being electrically connected to said first wiring layer upon irradiation of the cross point with a laser beam, at least one hole being formed in at least one of the first wiring layer and the second wiring layer included in the cross point so as to decrease the area of the cross point.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrated presently preferred embodiments of the invention and together with the general description given above and the detailed description of the preferred embodiments given below, serve to explain the principles of the invention.

FIG. 1A is a plan view showing a laser contact portion included in a conventional liquid crystal display device;

FIG. 1B is a cross sectional view along the line $D_1-D_2$ shown in FIG. 1A;

FIG. 3B is a cross sectional view along the line $A_1-A_2$ shown in FIG. 3A;

FIG. 4 is an equivalent circuit diagram showing one pixel of a TFT LCD device;

FIGS. 5A and 5B are graphs showing how the pixel potential is shifted by a switching noise in the OFF stage of a transistor;

FIGS. 6A and 6B are equivalent circuit diagrams showing the states both before and after the repair of one pixel of a LCD device including a first TFT and an auxiliary TFT;

FIG. 7A is a plan view showing a laser contact portion of an LCD device according to a second embodiment of the present invention;

FIG. 7B is a cross sectional view along the line $B_1-B_2$ shown in FIG. 7A;

DETAILED DESCRIPTION OF THE PREFERRED EMBODIMENTS

Figure 2:
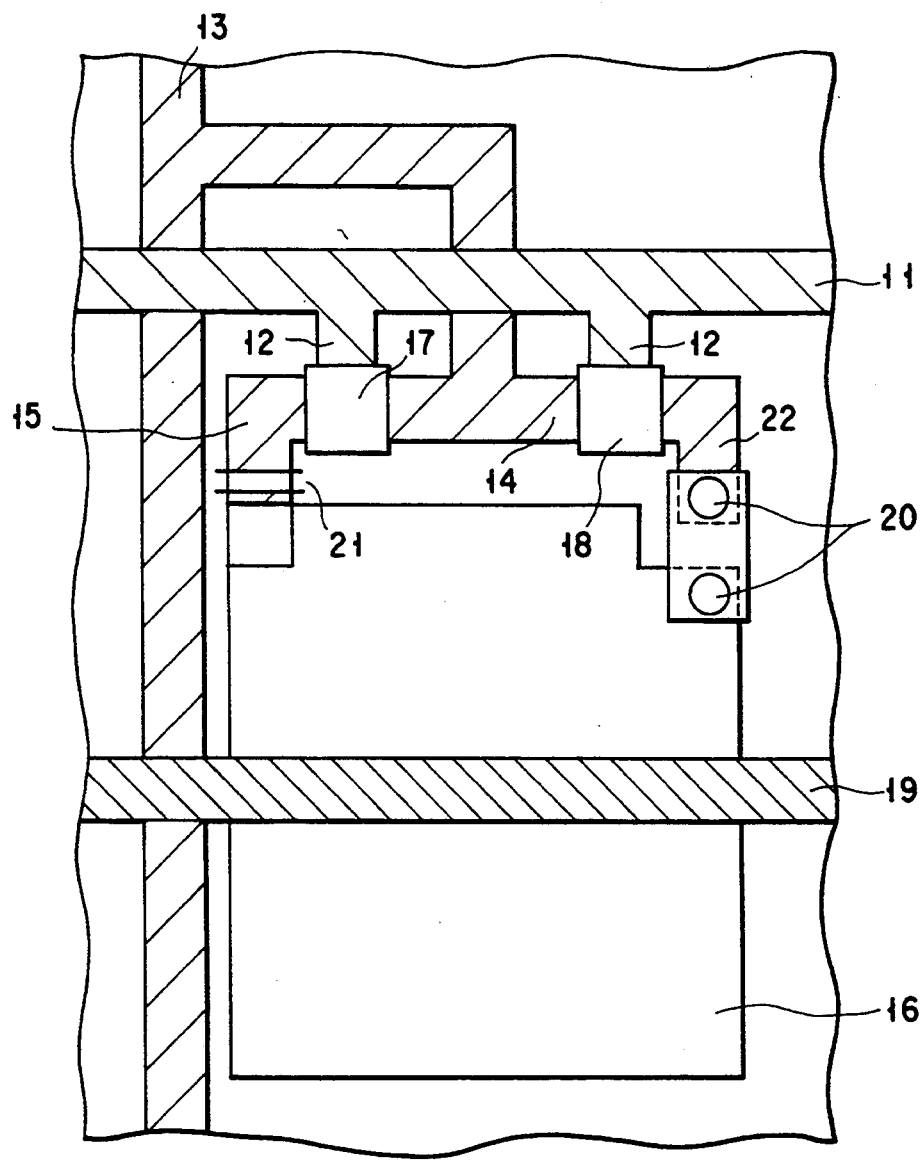
FIG. 2 is a plan view showing a substrate, as seen from the back side, according to a first embodiment of the present invention, said substrate representing a pixel of a liquid crystal display (LCD) device including a first thin film transistor (TFT) and an auxiliary TFT.

Let us described preferred embodiments of the present invention with reference to the accompanying drawings. First of all, FIG. 2 is a plan view showing one pixel included in an active matrix type TFT liquid crystal display device according to a first embodiment of the present invention. Incidentally, an interlayer insulating film is omitted from the drawing of FIG. 2.

As shown in FIG. 2, a scanning line 11 is connected to a gate electrode 12, with a signal line 13 being connected to a drain electrode 14. A source electrode 15 is connected to a pixel electrode 16. Another source electrode 22 is also connected to the pixel electrode 16 via a laser contact portion 20. In the laser contact portion 20, common conductor layers are connected in a superposed fashion to the source electrode 22 and the pixel electrode 16 via interlayer insulating films, respectively. A reference numeral 17 denotes a thin film transistor (TFT), with another reference 18 denoting an auxiliary TFT. A wiring 19 is maintained to a constant potential. An insulating layer is interposed between the wiring 19 and the pixel electrode 16 so as to form a capacitor.

In the TFT array of the construction described above, a signal voltage is applied to the signal line 13. Also, a scanning voltage is applied to the scanning line 11. As a result, each TFT is switched so as to supply a signal through TFT 17 to the pixel electrode 16.

It should be noted that the TFT 17 is connected to the pixel electrode 16. However, the auxiliary TFT 18 is under a waiting state. In other words, the laser contact portion 20 is interposed between the auxiliary TFT 18 and the pixel electrode 16 and, thus, the auxiliary TFT 18 is not electrically connected to the pixel electrode 16. Where the TFT 17 is defective, however, the two laser contact portions 20 are electrically connected to each other by means of a laser beam irradiation. Likewise, the source electrode 15 is of the TFT 17 is cut at a portion 21 by a laser beam irradiation. As a result, the auxiliary TFT 18 can be electrically connected to the pixel electrode 16. What should be noted is that it is very unlikely for the two TFTs to become defective simultaneously. It follows that the defective pixel in which the TFT is unsatisfactory can be repaired substantially completely by the particular method described above.

Figure 3A:
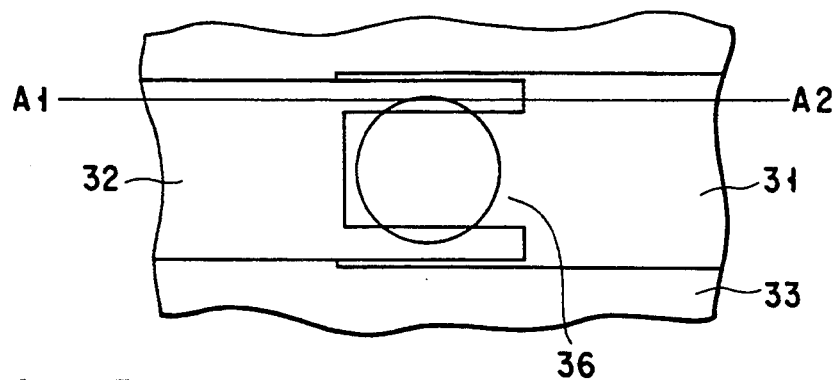
FIG. 3A is a plan view showing a laser contact portion of a LCD device according to the first embodiment of the present invention.

FIG. 3A is a plan view showing conductor layers superposed one upon the other in the laser contact portion included in the drawing of FIG. 2. In the drawing of FIG. 3A, reference numerals 31 and 32 denote a first conductor layer and a second conductor layer, respectively. These first and second conductor layers 31 and 32 are formed to overlap each other in the edge portions. Also, a laser beam irradiation potion is denoted by a reference numeral 36. To be more specific, a laser beam is applied to the overlapping portion of the first and second conductor layers. A laser beam is applied on the side of the substrate. Thus, the first conductor layer 31 is irradiated first with the laser beam. Incidentally, an insulating film is omitted from the drawing of FIG. 3A. It is seen that, in the laser beam irradiation portion 36, an edge portion of the second conductor layer 32 is cut away in the central portion such that a peripheral region alone is left unremoved so as to decrease the area of the overlapping portion. In the example shown in FIGS. 3A and 3B, the area of the portion where the first conductor layer and the second conductor layer are allowed to overlap each other is lowered to about 30% of the case where the edge portion of the second conductor layer 32 is not cut away. In other words, the substantial overlapping area is decreased, making it possible to lower the parasitic capacitance in the laser contact portion.

FIG. 3B is a cross sectional view along the line $A_1$–$A_2$ shown in FIG. 3A. As shown in FIG. 3B, a first conductor layer 31, an insulating film 34, a second conductor layer 32 and a passivation film 35 are formed in this order on a substrate 33. A liquid crystal is sealed in a region defined on the passivation film 35. If a laser beam is applied in a direction denoted by E, the energy of the laser beam is absorbed first by the first conductor laser 31, with the result that the first conductor layer 31 is rapidly heated so as to be liquefied or gasified, leading to a volume expansion. As a result, the insulating film 34 and the passivation film 35 are broken to form a hole. In this step, the liquid layer of the first conductive layer 31 is attached to the wall defining the hole noted above so as to be fused to the second conductive layer 32 and, thus, to achieve an electrical connection between the first conductive layer 31 and the second conductive layer 32. It should be noted that the peripheral region at the edge portion of the second conductive layer 32 is left unremoved, as described previously, with the result that no problem is brought about in respect of the electrical connection between the first conductive layer 31 and the second conductive layer 32. It follows that the defective pixel relating to an unsatisfactory TFT can be repaired substantially completely.

In the embodiment shown in FIGS. 2 to 3, the second conductor layer 32 is selectively removed in advance in the central portion in the inner region of the laser beam irradiating portion, as described previously, making it possible to suppress markedly the amount of the conductor scattered into a liquid crystal layer by the laser beam irradiation. It follows that it is possible to suppress the damage caused by the material scattered into the liquid crystal layer. It has been clarified by an experiment conducted by the present inventors that occurrence of a display defect can also be suppressed as a result of the effect of suppressing the damage noted above.

It is desirable for the area of that region of the second conductor layer 32 which is removed in advance to be somewhat smaller than the area of the laser beam irradiation. Where the removed region of the second conductor layer 32 is determined in this fashion, it is possible to diminish the parasitic capacitance while ensuring a high success rate in the repairing function. In the embodiment described above, only one region is removed in the edge portion of the second conductor layer 32. However, it is also possible to remove a plurality of small regions in the edge portion of the second conductor layer 32. In other words, the edge portion of the second conductor layer 32 may be selectively removed to form an edge portion shaped like a comb.

In applying a laser beam to a liquid crystal display device, it is absolutely necessary to apply the laser beam from the back surface of the substrate. However, before manufacture of a liquid crystal display device, i.e., under the state in which a liquid crystal has not yet been sealed as in FIG. 3B, a laser beam may be applied from either the front surface or back surface of the substrate. In general, a laser beam is applied from the back surface of the substrate after manufacture of a liquid crystal display device because a defect is found by displaying a picture image.

It is known to the art that, in a TFT array, a switching noise is generated in the OFF stage of a transistor, giving rise to the shifting of the pixel voltage. FIGS. 4, 5A and 5B are intended to explain the shifting of the pixel voltage.

To be more specific, FIG. 4 is an equivalent circuit diagram covering one pixel of a TFT array including terminals A, B, D and E. It should be noted that a TFT 41, a parasitic capacitance 42 present between the gate and the source of the TFT, a liquid crystal capacitance 43, and a storage capacitance 44 are connected as shown in FIG. 4. The terminal A is connected to a signal line, with the terminal B being connected to a scanning line. On the other hand, the terminals D and E are connected to counter electrodes, respectively.

If a pulse wave dVg of a magnitude 51 as shown in FIG. 5A is supplied to the terminal B, while applying voltage Vd to the terminal A of the circuit shown in FIG. 4, the potential at point C shown in FIG. 4 exhibits its such a characteristic as shown in FIG. 5B. In the graph shown in each of FIGS. 5A and 5B, the pixel voltage is plotted on the ordinate, with time plotted on the abscissa. A voltage shift 52 shown in FIG. 5B is a phenomenon which is brought about by the parasitic capacitance 42 of the transistor.

The potential shift 52, i.e., the value of dVp, can be obtained by formula (1) given below:

$$dVp = Cgs/(Cgs + Clc + Cs) \times dVg \tag{1}$$

where:
dVg is the shifting amount 51 of the gate voltage in the OFF stage of the transistor;
Cgs is the parasitic capacitance 42 present between the gate and the source of the TFT;
Clc is the liquid crystal capacitance 43; and
Cs is the storage capacitance 44.

It is known to the art that the display characteristics are greatly affected by dVp because the brightness of the pixel is determined by the effective voltage shown in FIG. 5B.

FIG. 6A shows an equivalent circuit diagram before the repair, i.e., before the laser beam irradiation for the switching of the TFT connected to the pixel. On the other hand, FIG. 6B shows an equivalent circuit diagram after the repair, i.e., after the laser beam irradiation for the switching of the TFT connected to the pixel.

Before the repair, a capacitor 61 showing the parasitic capacitance between the gate and the source of the first TFT, a parasitic capacitance 62 present between the gate and the source of the auxiliary TFT, a parasitic capacitance 63 in the laser contact portion a liquid crystal capacitance 43 and a storage capacitance 44 are connected as shown in the equivalent circuit diagram of FIG. 6A. A terminal G shown in FIG. 6A is connected to a scanning line. On the other hand, terminals D and E are respectively connected to a common electrode.

After the repair, the first TFT is disconnected. Also, an electrical connection of the second TFT is achieved within the laser contact portion. It follows that the parasitic capacitance 61 between the gate and the source of the first TFT and the parasitic capacitance 63 in the laser contact portion are caused to disappear, as seen from the equivalent circuit diagram shown in FIG. 6B. The terminal G included in the equivalent circuit diagram shown in FIG. 6B is connected to a scanning line. On the other hand, terminals B and C are respectively connected to a common electrode.

In the circuit shown in FIG. 6A, an apparent magnitude of the capacitance can be represented as follows:

$$Cgs \times (1 + C/(Cgs + C)) \tag{2}$$

where Cgs represents each of the parasitic capacitance 61 of the first TFT and the parasitic capacitance 62 of the auxiliary TFT, and C denotes the parassitic capacitance of the laser contact portion.

If the capacitance represented by formula (2) given above is substituted for Cgs in formula (1), the voltage shift $dVp_1$ can be represented formula (3) as given below:

$$dVp_1 = Cgs \times (1 + C/(Cgs + C))/(Cgs \times (1 + C/(Cgs + C)) + Clc + Cs) \times dVg \tag{3}$$

On the other hand, a punch-through voltage shift $dVp_2$ in the circuit shown in FIG. 6B can be represented by formula (4) given below, as apparent from formula (1) given previously:

$$dVp_2 = Cgs/(Cgs + Clc + Cs) \times dVg \tag{4}$$

As apparent from comparison between formulas (3) and (4), a relationship $dvp_1 - dvp_2 > 0$ is established without fail because the value of the parasitic capacitance C is constant in the laser contact portion. If the value of the parasitic capacitance C in the laser contact portion is large as in the prior art, the value of $dVp_1 - dVp_2$ is increased, with the result that a large difference is generated in the voltage shift between the state before the repair and the state after the repair. What should be noted is that the display characteristics of the pixel are greatly affected by the large difference in the voltage shift. In order to diminish the difference between $dVp_1$ and $dVp_2$ as much as possible, it is desirable to diminish the parasitic capacitance C in the laser contact portion as much as possible.

In the present invention, it is desirable to suppress the area of the overlapping portion between the first conductor layer and the second conductor layer at a value which does not exceed 70% of the value for the prior art.

According to an experiment conducted by the present inventors, it is possible to markedly improve the display characteristics, if the area of the overlapping portion is set not to exceed 50% of the area for the prior art under the condition that the parasitic capacitance C in the laser contact portion is suppressed to at most about 50% of the value for the prior art.

To be more specific, the conditions of the laser contact portion for the prior art were set at: Vg=26 V, Cgs=0.03 pF, Clc+Cs=0.35 pF, C=0.008 pF. In this case, difference in the voltage shift dVp between the unrepaired (normal) pixel and the repaired pixel was found to be 0.4 V, and the difference in brightness was found to be at most about 10%. On the other hand, where the area of the overlapping region in the laser contact portion was set at a value which did not exceed 50% of the value for the prior art, and the parasitic capacitance C in the laser contact portion was set at about 50% of the value for the prior art, difference in the voltage shift dVp between the unrepaired pixel and the repaired pixel was found to be 0.2 V and the difference in brightness was markedly lowered to at most about 1%. Such a difference in voltage shift dVp was not recognized at all after repairing.

FIG. 7A is a plan view showing a laser contact portion in a pixel of an active matrix type TFT liquid crystal display device according to a second embodiment of the present invention. Reference numerals 71 and 72 in FIG. 7A denote a first conductor layer and a second conductor layer, respectively. Further, a reference numeral 36 represents a laser beam irradiating portion. In the embodiment shown in FIG. 3A, the edge portion of the second conductor layer 32 is selectively removed in the central portion. In the embodiment shown in FIG. 7A, however, the edge portion, to which a laser beam is incident, of the first conductor layer 71 is selectively removed in the central portion (inner portion). In the embodiment shown in FIG. 7A, the area of the overlapping portion is suppressed to about 30% compared with the prior art in which the central portion of the laser irradiation portion is not removed. The reduction in the substantial overlapping area permits suppressing the parasitic capacitance an the laser contact portion.

FIG. 7B is a cross sectional view along the line $B_1$–$B_1$ shown in FIG. 7A. It is seen that the first conductor layer 71, an insulation film 34, the second conductor layer 72 and a passivation film 35 are formed in this order on a substrate 33. A liquid crystal is sealed in a region defined on the passivation film 35 as seen from the substrate 33.

If a laser beam is applied in a direction denoted by E in FIG. 7B, the energy of the laser beam is simultaneously absorbed by both the first conductor layer 71 and the second conductor layer 72 because the central portion of the first conductor layer 71 is removed in advance. As a result, these first and second conductor layers 71, 72 are rapidly heated so as to be liquefied or gasified, leading to a volume expansion. Because of the volume expansion, the insulation film 34 and the passivation film 35 are broken to form a hole. It should be noted that the liquid layer of the first conductor layer 71 and the second conductor layer 72 is attached to the wall defining the hole formed as a result of the laser beam irradiation. It follows that the first and second conductor layers 71 and 72 are fused and connected to each other so as to achieve an electrical connection between the two. It should be noted that the first conductor layer 71 is not cut away in the laser beam irradiation portion, with the result that no problem is generated in respect of the electrical connection, making it possible to maintain a high rate of success in the repairing.

As described above, the edge portion of the first conductor layer 71 is selectively removed in advance in the central portion, with the result that it is possible to suppress markedly the amount of the conductor film scattered into the liquid crystal layer by the laser beam irradiation. It has been experimentally clarified by the present inventors that the occurrence of the display defect caused by the damage done to the liquid crystal layer can also be suppressed.

It is desirable for the area of the removed portion of the first conductor layer 71 to be somewhat smaller than the area of the laser beam irradiation. In this case, the parasitic capacitance can be diminished while maintaining a high rate of success in repairing. Further, it is possible to remove selectively each of the first conductor layer 71 in a plurality of regions to form a comb-shaped edge portion in the laser contact portion, as in the embodiment described previously.

Figure 8A:
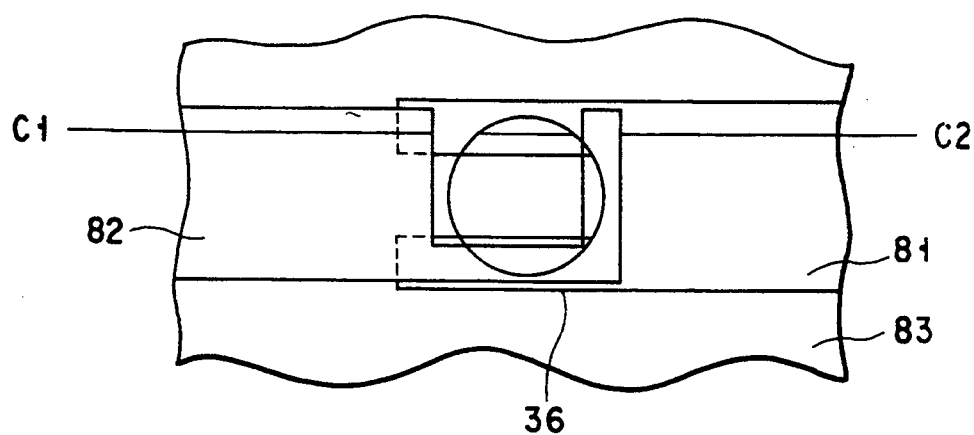
FIG. 8A is a plan view showing a laser contact portion of an LCD device according to a third embodiment of the present invention.

FIG. 8A is a plan view showing a laser contact portion in a pixel of an active matrix type TFT liquid crystal display device according to a third embodiment of the present invention. Reference numerals 81 and 82 shown in FIG. 8A represent a first conductor layer and a second conductor layer, respectively. Further, a reference numeral 36 denotes a laser beam irradiation portion. In this embodiment, the edge portion of the first conductor layer 81 positioned within the laser beam irradiation portion is selectively removed to form a ]-shaped edge portion. Likewise, the edge portion of the second conductor layer 82 positioned within the laser beam irradiation portion is selectively removed to form a hook-shaped edge portion. In this embodiment, the area of the overlapping portion between the first and second conductor layers is suppressed to about 25% compared with the prior art in which the conductor layers are not selectively removed in the edge portions within the laser beam irradiation portion. In other words, the substantial overlapping area is much diminished in the embodiment shown in FIG. 8A, leading to reduction in the parasitic capacitance in the laser contact portion.

Figure 8B:
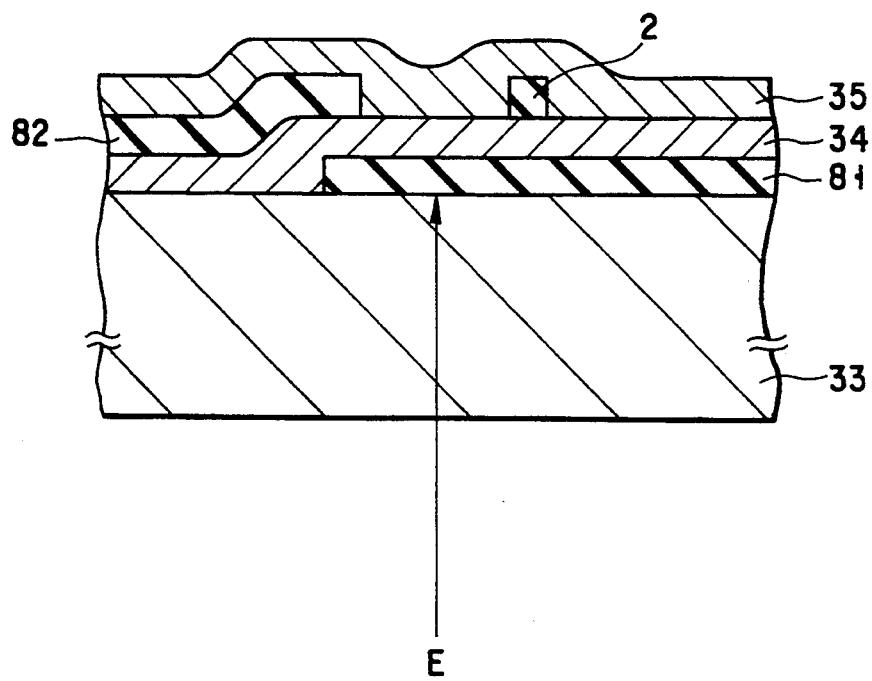
FIG. 8B is a cross sectional view along the line $C_1-C_2$ shown in FIG. 8A.

FIG. 8B is a cross sectional view along the line $C_1$–$C_2$ shown in FIG. 8A. As shown in FIG. 8B, the first conductor layer 81, an insulating layer 34, the second conductor layer 82, and a passivation film 35 are formed in this order on a substrate 33. A liquid crystal is sealed in a region defined on the passivation film 35 as seen from the substrate 33.

If a laser beam is applied in a direction E shown in FIG. 8B, the energy of the laser beam is simultaneously absorbed by both the first conductor layer 81 and the second conductor layer 82 since these first and second conductor layers are selectively removed within the laser beam irradiation portion. As a result, these first and second conductor layers 81 and 82 are rapidly heated so as to be liquefied or gasified, leading to a volume expansion. As a result, the insulation film 34 and the passivation film 35 are broken to form a hole. In this step, the liquid phase of the first conductor layer 81 and the second conductor layer 82 is attached to the wall defining the hole formed as a result of the laser beam irradiation, with the result that the first and second conductor layers are fused and connected to each other so as to achieve an electrical connection between the two. It should be noted that the hook-shaped edge portions of the first and second conductor layers 81 and 82 within the laser beam irradiation portion are left unremoved. It follows that no problem is brought about in respect of the electrical connection between the first and second conductor layers, leading to a high rate of success in repairing.

In the embodiment shown in FIG. 8, the edge portions of the first conductor layer 81 and the second conductor layer 82 are selectively removed in advance in the central portions, with the result that it is possible to suppress markedly the amount of the conductor film scattered into the liquid crystal layer by the laser beam irradiation. It has been experimentally clarified by the present inventors that the occurrence of the display defect caused by the damage done to the liquid crystal layer can also be suppressed.

It is desirable for the area of the removed portion of each of the first conductor layer 81 and the second conductor layer 82 to be somewhat smaller than the area of the laser beam irradiation. In this case, the parasitic capacitance can be diminished while maintaining a high rate of success in repairing. Further, it is possible to remove selectively each of the first conductor layer 81 and the second conductor layer 82 in a plurality of regions to form a comb-shaped edge portion in the laser contact portion, as in the embodiment described previously.

In any of the embodiments described above, the technical idea of the present invention is applied to a liquid crystal display device, in which a TFT connected to a pixel electrode and another TFT which is not connected to the pixel electrode are formed for each pixel. The liquid crystal display device of this type is constructed such that, where the TFT connected to the pixel electrode does not perform a normal function, the connection between the TFT and the pixel electrode is broken by a laser beam irradiation, while permitting said another TFT, which is not connected to the pixel electrode, to be connected to the pixel electrode by the laser beam irradiation.

However, the technical idea of the present invention can also be applied to another portion of a liquid crystal display device as described below.

Specifically, a laser contact portion may be formed between the gate electrode 14 and the scanning line 11, or between the drain electrode 14 and the signal line 13.

Figure 9:
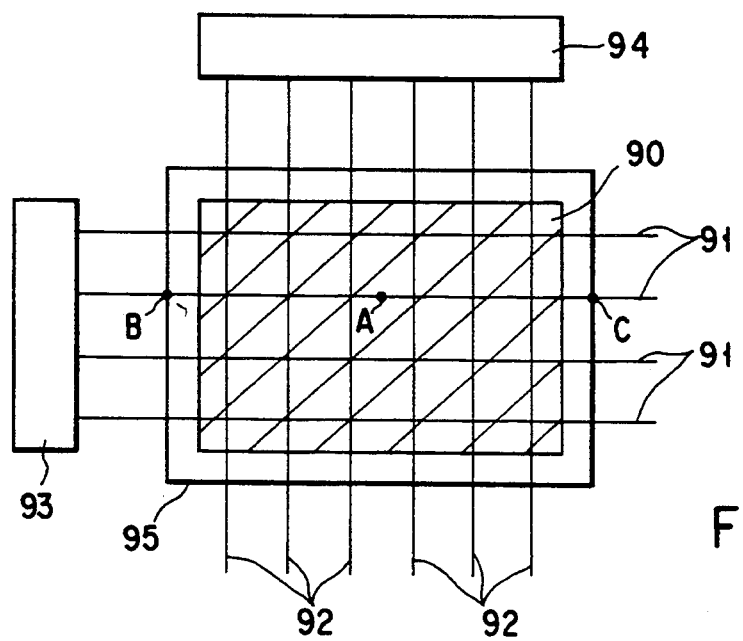
FIG. 9 is a wiring diagram showing that a by-pass line is formed in the vicinity of a display region of an LCD device according to a fourth embodiment of the present invention.

Furthermore, FIG. 9 shows a wiring diagram for a liquid crystal display device according to a fourth embodiment of the present invention. As shown in FIG. 9, a number of scanning lines 91 and signal lines 92 are provided in a mutually crossing fashion in a display region 90. These scanning lines 91 and the signal lines 92 are connected to driving circuits 93 and 94, respectively, formed outside the display region 90. A by-pass line 95 is arranged to cross each of these scanning lines 91 and signal lines 92 with an insulating layer interposed therebetween. Where the scanning line 91 is broken at, for example, a point A, cross points B and C at which the scanning line 91 crosses the by-path line 95 are irradiated with a laser beam so as to achieve an electrical connection between the scanning line 91 and the by-path line 95 and, thus, to repair the breakage.

Figure 10:
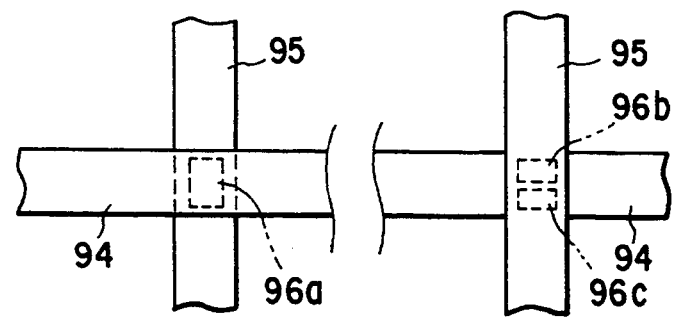
FIG. 10 is a plan view showing a laser contact portion included in the by-path line shown in FIG. 9.

However, a problem remains unsolved in the technique of arranging such a by-path line 95. Specifically, where the by-path line 95 is long, the by-path line 95 crosses the scanning lines 91 and the signal lines 92 in many points, leading to an increase in the parasitic capacitance. Naturally, the signal transmission is delayed by the increased parasitic capacitance. To overcome the difficulty, the technical idea of the present invention is applied to the cross points where the by-path line 95 crosses the scanning lines 91 and the signal lines 92. To be more specific, holes 96a, 96b, 96c are formed in those portions of the by-path line 95 which are positioned about the central portion of the laser beam irradiation portion, as shown in FIG. 10. Naturally, the presence of these holes 96a, etc. permits decreasing the parasitic capacitance, making it possible to prevent the delay of the signal transmission.

In each of the embodiments described above, the technical idea of the present invention is applied to a liquid crystal display device. However, it is possible to apply the technical idea of the present invention widely to an integrated circuit as far as it is effective to decrease the parasitic capacitance in the laser contact portion.

Figure 11:
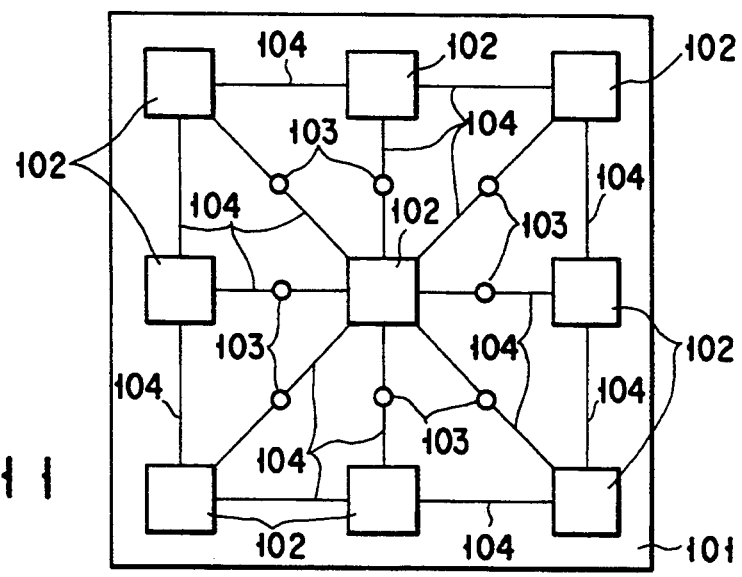
FIG. 11 is a plan view showing an integrated circuit according to a fifth embodiment of the present invention.

FIG. 11 is a plan view showing an integrated circuit according to a fifth embodiment of the present invention. As shown in the drawing, an element 102, e.g., a transistor, a laser contact portion 103, and a wiring 104 are arranged on the surface of a substrate 101, e.g., a silicon substrate. In this embodiment, a laser beam is applied from the upper surface of the substrate. What should be noted is that an optional apparatus as desired can be prepared by selectively achieving an electrical connection in the optional laser contact portions included in the apparatus of the construction as shown in FIG. 11, which is prepared in advance. In other words, an apparatus prepared in advance can be optionally corrected and repaired, making it possible to supply promptly the apparatus manufactured on the order-made basis to the customer. The particular system permits improving the yield compared with the manufacture on the basis of the expected needs. What should also be noted is that the parasitic capacitance in the laser contact portion can be markedly suppressed in the fourth embodiment shown in FIG. 11, leading to a high reliability of the apparatus.

In the embodiments described above, two conductor layers are electrically connected to each other in the laser contact portion. Of course, however, it is possible to apply the technical idea of the present invention to a laser contact portion in which three or more conductor layers are superposed one upon the other.

Further, the technical idea of the present invention can be applied to the case where wirings alone are integrated such that a wiring chip is formed into an optional pattern by applying a laser beam irradiation. In this case, an undesired parasitic capacitance can be decreased, leading to an improved reliability.

Further, the technical idea of the present invention can be embodied in the form of various modifications within the technical scope of the present invention.

As described above in detail, the present invention makes it possible to suppress the parasitic capacitance in the laser contact portion while maintaining a nigh rate of success in the repair. It follows that it is possible to prevent the element characteristics from being deteriorated by the parasitic capacitance in the laser contact portion, with the result that the difference in the element characteristics can be diminished between the state before the repair and the state after the repair.

Additional advantages and modifications will readily occur to those skilled in the art. Therefore, the invention in its broader aspects is not limited to the specific details, and representative device, shown and described herein. Accordingly, various modifications may be made without departing from the spirit or scope of the general inventive concept as defined by the appended claims and their equivalents.

What is claimed is:

1. A wiring for an electronic circuit, comprising a substrate; a first conductor layer formed on said substrate; an first conductor layer formed on said insulating layer; and a second conductor layer formed on said insulating layer such that said second conductor layer overlaps with at least a part of said first conductor layer; wherein an inner portion of at least one of that portions of said first conductor layer and said second conductor layer which overlaps with each other is removed at least partially to cause the peripheral portion to remain unremoved at least partially, thereby decreasing the area of the overlapping portion.

2. The wiring for an electronic circuit according to claim 1, wherein said second conductor layer is electrically connected to said first conductor layer upon irradiation of said overlapping portion with a laser beam.

3. The wiring for an electronic circuit according to claim 1, wherein said removed region of the conductor layer is positioned within an irradiation region of said laser beam.

4. The wiring for an electronic circuit according to claim 1, wherein said first conductor layer and said second conductor layer are formed to cross each other, and at least one hole is formed in the overlapping portion of at least one of the first conductor layer and the second conductor layer.

5. A liquid crystal display device comprising:
a substrate;
a pixel electrode formed on said substrate;
a signal line formed on said substrate;

a first switching element formed on said substrate and connected to said pixel electrode and said signal line;

a second switching element formed on said substrate; and a connecting means for electrically connecting said second switching element to said pixel electrode and said signal line when said first switching element is defective, including a first conductor layer, an insulating layer formed on said first conductor layer, and a second conductor layer formed on said insulating layer overlapping with at least a part of said first conductor layer, wherein an inner portion of at least one of the overlapping portions of said first conductor layer and said second conductor layer is removed at least partially to cause the peripheral portion to remain at least partially such that said first conductor layer is electrically connected to said second conductor layer upon irradiation of said overlapping portion with a high energy beam when said first switching element is defective.

6. The liquid crystal display device according to claim 5, wherein the connecting means is formed between said second switching element and said signal line.

7. The liquid crystal display device according to claim 5, wherein the connecting means is formed between said second switching element and said pixel electrode.

8. The liquid crystal display device according to claim 5, wherein the area of said overlapping portion is at most 70% of the area for the case where the inner portion of any of the first and second conductor layers is not partially removed.

9. The liquid crystal display device according to claim 5, wherein the area of said overlapping portion is at most 50% of the area for the case where the inner portion of any of the first and second conductor layers is not partially removed.

10. The liquid crystal display device according to claim 5, wherein said removed region of the conductor layer is positioned within an irradiation region of said laser beam.

11. The liquid crystal display device according to claim 5, wherein said first conductor layer and said second conductor layer are formed to overlap each other in the edge portions thereof and at least one of these overlapping edge portions is cut out in the central portion to permit the peripheral region to remain unremoved.

12. The liquid crystal display device according to claim 5, wherein said first conductor layer and said second conductor layer are formed to overlap each other in the edge portions thereof.

13. The liquid crystal display device according to claim 5, wherein said first conductor layer and said second conductor layer are formed to overlap each other in the edge portions thereof and at least one of these edge portions is cut out to form a hook-shaped edge portion.

14. The liquid crystal display device according to claim 5, wherein said first conductor layer and said second conductor layer are formed to overlap each other in the edge portions thereof and at least one of these edge portions is cut out to form a hook-shaped edge portion, with the other edge portion being cut out to permit a side portion to remain unremoved.

15. A liquid crystal display device comprising:

a pixel electrode;

a signal line;

a search line;

a first transistor connected to said pixel electrode and said signal line, whose gate electrode is connected to said search line;

a second transistor connected to said pixel electrode and said signal line; and a connecting means for electrically connecting said second transistor's gate electrode to said search line when said first transistor is defective, including a first conductor layer, a first insulating layer formed on said first conductor layer, and a second conductor layer formed on said insulating layer overlapping with at least a part of said first conductor layer, wherein an inner portion of at least one of the overlapping portions of said first conductor layer and said second conductor layer is removed at least partially to cause the peripheral portion to remain at least partially such that said first conductor layer is electrically connected to said second conductor layer upon irradiation of said overlapping portion with a high energy beam when said first transistor is defective.

16. The liquid crystal display device according to claim 15, further comprising a second connecting means for electrically connecting said second transistor to said pixel electrode or said signal line, including:

a third conductor layer, a second insulating layer formed on said third conductor layer, and a fourth conductor layer formed on said second insulating layer overlapping with at least a part of said third conductor layer, wherein an inner portion of at least one of the overlapping portions of said third conductor layer and said fourth conductor layer is removed at least partially to cause the peripheral portion to remain at least partially such that said third conductor layer is electrically connected to said fourth conductor layer upon irradiation of said overlapping portion with a high energy beam when said first transistor is defective.

17. The liquid crystal display device according to claim 15, wherein the area of said overlapping portion is at most 70% of the area for the case where the inner portion of any of the first and second conductor layers is not partially removed.

18. The liquid crystal display device according to claim 15, wherein the area of said overlapping portion is at most 50% of the area for the case where the inner portion of any of the first and second conductor layers is not partially removed.

19. The liquid crystal display device according to claim 15, wherein said removed region of the conductor layer is positioned within an irradiation region of said high energy beam.

20. The liquid crystal display device according to claim 15, wherein said first conductor layer and said second conductor layer are formed to overlap each other in the edge portions thereof and at least one of these overlapping edge portions is cut out in the central portion to permit the peripheral region to remain unremoved.

21. The liquid crystal display device according to claim 15, wherein said first conductor layer and said second conductor layer are formed to overlap each other in the edge portions thereof and at least one of these edge portions is cut out to form a comb-shaped edge portion.

22. The liquid crystal display device according to claim 15, wherein said first conductor layer and said second conductor layer are formed to overlap each other in the edge portions thereof and at least one of these edge portions is cut out to form a hook-shaped edge portion.

23. The liquid crystal display device according to claim 15, wherein said first conductor layer and said second conductor layer are formed to overlap each other in the edge portions thereof and at least one of these edge portions is cut out to form a hook-shaped edge portion, with the other edge portion being cut out to permit a side portion to remain unremoved.

24. A liquid crystal display device, comprising a liquid crystal display section; a driving circuit for driving said liquid crystal display section; a first wiring layer for achieving an electrical connection between said liquid crystal display section and said driving circuit; and a second wiring layer formed in the vicinity of the liquid crystal display section in a manner to cross said first wiring layer; wherein said cross point between said first wiring layer and said second wiring layer comprises a first wiring layer, an insulating layer formed on said first wiring layer, and a second wiring layer formed on said insulating layer to cross said first insulating layer, said second wiring layer being electrically connected to said first wiring layer upon irradiation of the cross point with a high energy beam, at least one hole being formed in at least one of the first wiring layer and the second wiring layer included in the cross point so as to decrease the area of the cross point.

* * * * *